US012777320B2

(12) United States Patent
Li

(10) Patent No.: US 12,777,320 B2
(45) Date of Patent: Oct. 27, 2026

(54) COMMUNICATION METHOD AND DEVICE, AND ELECTRONIC DEVICE AND COMPUTER-READABLE STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 524 days.

(21) Appl. No.: 18/000,378

(22) PCT Filed: Jun. 16, 2020

(86) PCT No.: PCT/CN2020/096381
§ 371 (c)(1),
(2) Date: Nov. 30, 2022

(87) PCT Pub. No.: WO2021/253232
PCT Pub. Date: Dec. 23, 2021

(65) Prior Publication Data
US 2023/0224693 A1 Jul. 13, 2023

(51) Int. Cl.
*H04W 8/22* (2009.01)
*H04W 48/16* (2009.01)

(52) U.S. Cl.
CPC ............. *H04W 8/22* (2013.01); *H04W 48/16* (2013.01)

(58) Field of Classification Search
CPC ......... H04W 8/22; H04W 48/16; H04W 8/24; H04W 24/02; H04W 28/18; Y02D 30/70; G06F 9/50
See application file for complete search history.

(56) References Cited

U.S. PATENT DOCUMENTS

2013/0094382 A1* 4/2013 Ahn ...................... H04W 76/28 370/252
2014/0043966 A1 2/2014 Lee et al.
2018/0349446 A1 12/2018 Triolo et al.
2019/0037425 A1 1/2019 Hong et al.
2020/0412417 A1* 12/2020 Calzolari ............. H04B 7/0404
2021/0219222 A1* 7/2021 Jia ....................... H04L 41/0806
2022/0030457 A1* 1/2022 Zheng ..................... H04L 5/001
2022/0400521 A1* 12/2022 Wei ....................... H04W 76/10
2023/0118031 A1* 4/2023 Cai ...................... H04B 7/0417 706/25

(Continued)

FOREIGN PATENT DOCUMENTS

CA 2688138 A1 12/2008
CN 101969676 A 2/2011

(Continued)

OTHER PUBLICATIONS

Machine Translation of Li et al. (Year: 2020).*

(Continued)

*Primary Examiner* — Khaled M Kassim
*Assistant Examiner* — Noah James Sugden
(74) *Attorney, Agent, or Firm* — McCoy Russell LLP

(57) ABSTRACT

A communication method includes: sending first information, where the first information is used for enabling a terminal to determine whether to initiate an artificial intelligence or machine learning operation-type service.

18 Claims, 3 Drawing Sheets

(56) References Cited

U.S. PATENT DOCUMENTS

2025/0071040 A1* 2/2025 Wang .................... G16Y 40/50

FOREIGN PATENT DOCUMENTS

| | | | | | |
|---|---|---|---|---|---|
| CN | 105474668 | A | | 4/2016 | |
| CN | 109309969 | A | | 2/2019 | |
| CN | 110322337 | A | | 10/2019 | |
| CN | 110637502 | A | | 12/2019 | |
| CN | 110691386 | A | | 1/2020 | |
| CN | 110730954 | A | | 1/2020 | |
| CN | 110785984 | A | | 2/2020 | |
| CN | 110831029 | A | | 2/2020 | |
| CN | 110856215 | A | | 2/2020 | |
| IN | 201941033959 | A | | 9/2019 | |
| WO | 2020068127 | A1 | | 4/2020 | |
| WO | WO-2020077523 | A1 | * | 4/2020 | ............... G06F 3/01 |

OTHER PUBLICATIONS

Machine Translation of WO 2020077523 A1 (Year: 2018).*

"3rd Generation Partnership Project; Technical Specification Group Radio Access Network; Evolved Universal Terrestrial Radio Access (E-UTRA); Radio Resource Control (RRC); Protocol specification (Release 16)," 3GPP TS 36.331, V16.0.0, Mar. 2020, 1048 pages.

* cited by examiner

COMMUNICATION METHOD AND DEVICE, AND ELECTRONIC DEVICE AND COMPUTER-READABLE STORAGE MEDIUM

CROSS REFERENCE TO RELATED APPLICATION

The present application is a U.S. National Phase of International Application No. PCT/CN2020/096381 entitled "COMMUNICATION METHOD AND DEVICE, AND ELECTRONIC DEVICE AND COMPUTER-READABLE STORAGE MEDIUM," and filed on Jun. 16, 2020. The entire contents of the above-listed application are hereby incorporated by reference for all purposes.

BACKGROUND

With continuous expansion and deepening of the fifth-generation mobile communication technology (5G), it is expected to realize deep integration of a mobile application and a network based on artificial intelligence (AI)/machine learning (ML).

SUMMARY

In one aspect, the disclosure provides a communication method. The communication method includes: sending first information, where the first information is used for enabling a terminal to determine whether to initiate an artificial intelligence or machine learning operation-type service.

In another aspect, the disclosure provides a communication method. The communication method includes: obtaining first information; and determining whether to initiate an artificial intelligence or machine learning operation-type service based on the first information.

In further another aspect, the disclosure provides a communication device. The communication device includes a sending module configured to send first information, where the first information is used for enabling a terminal to determine whether to initiate an artificial intelligence or machine learning operation-type service.

In further another aspect, the disclosure provides a communication device. The communication device includes: an obtaining module configured to obtain first information; and a processing module configured to determine whether to initiate an artificial intelligence or machine learning operation-type service based on the first information.

The disclosure further provides an electronic device. The electronic device includes a memory and a processor. The memory stores a computer program, and the computer program is used for executing the method described above in response to running the computer program.

The disclosure further provides a non-transitory computer-readable storage medium. The storage medium stores a computer program, and the computer program, in response to being run by a processor, is used for executing the method described above.

BRIEF DESCRIPTION OF THE DRAWINGS

In order to more clearly illustrate technical solutions of the examples of the disclosure, the drawings needed for the description of the examples of the disclosure will be briefly introduced below.

DETAILED DESCRIPTION

Figure 1:
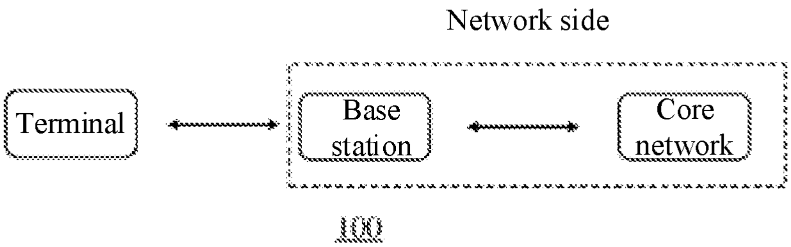
FIG. 1 is a schematic diagram of an architecture of a communication system.

Examples of the disclosure are described below in detail. Instances of the examples are shown in drawings. The same or similar reference numbers represent the same or similar elements or elements with the same or similar functions from beginning to end. The examples described below with reference to the drawings are only examples, are merely used to explain the disclosure, and cannot be interpreted as a limitation to the disclosure.

Those skilled in the art may understand that, unless expressly stated, singular forms "one", "a", "the said" and "this" used here may also include plural forms. It should be further understood that the wording "include" used in the specification of the disclosure refers to the existence of a feature, an integer, a step, an operation, an element and/or a component, but not excluding existence or adding one or more other features, integers, steps, operations, elements, components and/or their combinations. It should be understood that when we state that the element is "connected" or "coupled" to the other element, it can be directly connected or coupled to the other element, or there may be an intermediate element. In addition, "connection" or "coupling" used here may include wireless connection or wireless coupling. The wording "and/or" used here includes all or any unit and all combinations of one or more associated listed items.

Unless otherwise defined, all the terms (including technical terms and scientific terms) used here have the same meanings generally understood by those ordinarily skilled in the art to which the disclosure belongs. It will be understood that although the terms "first", "second", and the like may be used here to describe various elements, these elements should not be limited by these terms. These terms are merely used to distinguish one element from another. Hence, the first element discussed below may be referred to as the second element without departing from the teaching of the examples.

The disclosure relates to the technical field of communications, in particular to a communication method and device, an electronic device and a computer-readable storage medium.

With continuous expansion and deepening of the fifth-generation mobile communication technology (5G), it is expected to realize deep integration of a mobile application and a network based on artificial intelligence (AI)/machine learning (ML).

An AI/ML-based mobile application is becoming more and more compute-intensive, memory-consuming, and power-consuming. Meanwhile, a terminal usually has strict limits on energy consumption, computing and memory cost. Hence, AI/ML operation-type services are usually separated on the terminal and a network-side node. However, for some network-side nodes, due to their limited resources, the AI/ML operation-type services initiated by the terminal cannot be handled sometimes. It can be seen that an existing communication method related to the AI/ML operation-type services still needs to be improved.

In order to make the objective, technical solutions and advantages of the examples of the disclosure clearer, the implementations of the disclosure will be described further in detail with reference to the drawings.

FIG. 1 is a schematic diagram of an architecture of a communication system 100 applicable to an example of the disclosure.

Referring to FIG. 1, the communication system 100 may include a terminal 101, a base station 102 and a core network 103, where the base station 102 and the core network 103 may be collectively referred to as a network side node. It may be understood that the architecture of the communication system 100 shown in FIG. 1 is merely an example, and the examples of the disclosure are not limited to this. For example, the communication system 100 may further include other nodes, such as an access point (AP) or a server in a wireless local area network. As an example, the terminal may include but is not limited to: a cellular phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IoT) device, and the like.

In order to split an AI/ML operation-type service on the terminal and a network (a server at a base station or core network side), for example, compute-intensive and energy-intensive parts of AI/ML may be unloaded to a network node, while privacy-sensitive and delay-sensitive parts are left on the terminal. The terminal may execute a specific part/stratum in an operation/model and send intermediate data to the network node. The network node executes the remaining parts/stratums and feeds back a reasoning result to the terminal.

The key to splitting the AI/ML operation-type service is to select the best splitting mode and splitting point to ensure that needed resources are lower than an upper limit of available resources on the terminal, and optimize computing, storage/memory, power consumption, communication resources on the terminal side and the network side. A logical node called a split scheduler of a network element node may execute the splitting of the AI/ML operation-type service. A network element may be deployed in a base station node or a core network node. For a base station, resource requirements for uplink and downlink are very different for different splitting modes. In one example, for a mode where an AI/ML operation is trained locally, since the download of an AI/ML model is involved, a large amount of downlink bandwidth is needed. For a mode where the AI/ML operation is trained in a cloud end of the network, since upload of training data is involved, a large uplink bandwidth is needed, while for the downlink, only the reasoning result after training is returned without a large downlink bandwidth. In addition, for a mode where local training and cloud training are performed simultaneously, both uplink and downlink require a large bandwidth. Hence, when a user (for example, the terminal of the user) initiates an application of model training, the bandwidth needed may be as high as more than 20 Gbps (gigabits per second), and a lot of computing resources are needed. From the perspective of network resource allocation, it corresponds to the allocation of a large amount of bandwidth, as well as the allocation of network computing resources (the memory and the processor). Hence, for some base stations, due to their limited resources, sometimes the AI/ML operation-type service initiated by the terminal (such as a model training operation) cannot be handled.

A communication method and device provided by the examples of the disclosure can notify the terminal of specific information (also known as auxiliary information) or an access strategy through the network node, so as to help the terminal to determine whether to initiate the AI/ML operation-type service (that is, whether to initiate AI/ML operation access). The examples of the disclosure will be described below with reference to FIG. 2-FIG. 5.

Figure 2:
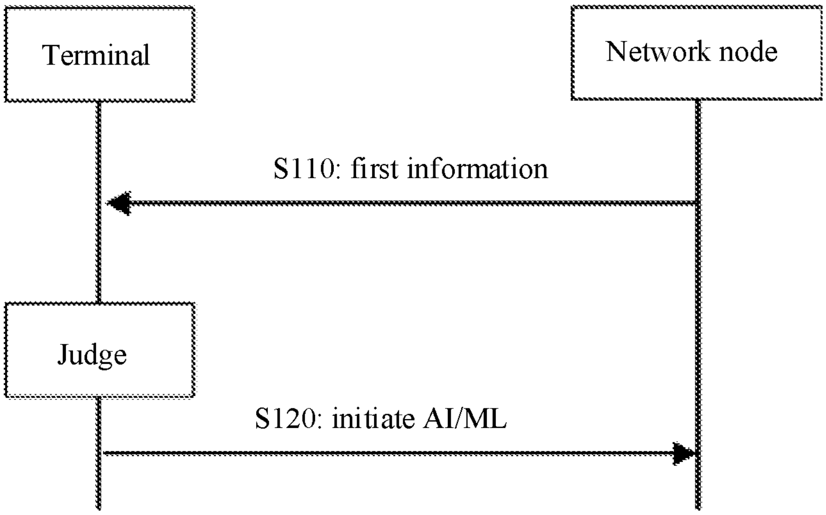
FIG. 2 is a schematic flow diagram of a communication method provided in an example of the disclosure.

FIG. 2 shows a schematic flow diagram of a communication method according to an example of the disclosure.

According to the example of the disclosure, in step S110, first information may be sent. Specifically, a network node may send (or notify) the first information (also known as auxiliary information) to a terminal. The first information is used for enabling the terminal to determine whether to initiate an AI/ML operation-type service.

According to the example of the disclosure, the network node may be a base station, an access point, or a core network node, and the first information may be sent by the base station, the access point, and/or the core network node. In one example, all contents of the first information may be sent by any one of the base station, the access point and the core network node. In another example, part of the first information may be sent by the base station or the access point, and the other part of the first information may be sent by the core network node. According to the example of the disclosure, the core network node may be a split scheduler as described above. In one example, the terminal may be notified of a first message in a system message or a dedicated signaling.

According to the example of the disclosure, the first information may include at least one of the following: information related to a network node capability, information related to a terminal capability, or access strategy information. Each of these will be described in detail later.

For the convenience of description, in the following description, the information related to the network node capability and/or the information related to the terminal capability may be referred to as first auxiliary information for short, and the access strategy information may be referred to as second auxiliary information.

In one example, the information related to the network node capability and the information related to the terminal capability in the first information may be sent by the base station or the access point, and the access strategy information in the first information may be sent by the core network node (for example, the split scheduler). However, this is merely an example, and the concept of the disclosure is not limited to this. For example, all information in the first information may be sent through one node.

According to the example of the disclosure, the information related to the network node capability in the first information may include at least one network node capability indication information. The at least one network node capability indication information may include at least one of the following: computing capability indication information, radio resource capability indication information, or backlink bandwidth indication information.

As a non-limiting example merely, the computing capability indication information may include occupancy of at least one of a memory, a CPU, and a storage space of the network node, which may be indicated by percentage or in a high-medium-low form. The radio resource capability indication information may include a bandwidth provided by the network node, a current spectrum utilization, and the like, which may also be indicated by percentage or in a high-medium-low form. The backlink bandwidth indication information may include a bandwidth of an interface link between a base station and a core network element, or a bandwidth of an interface link between the base station and a dedicated server providing an AI/ML service.

According to the example of the disclosure, the information related to the network node capability in the first information may further include: a threshold corresponding to each network node capability indication information among the at least one network node capability indication information.

According to the example of the disclosure, in a case that the at least one network node capability indication information includes the computing capability indication information, the radio resource capability indication information and/or the backlink bandwidth indication information, the information related to the network node capability may further include: a computing capability judging threshold, a radio resource capability judging threshold, and/or a backlink bandwidth judging threshold. Such threshold information is used for making the terminal compare each network node capability indication information in the first information with the corresponding threshold to judge whether to initiate the AI/ML operation-type service. This will be described in detail later in a judgment step executed by the terminal.

As an example, the above threshold information may be included in the first information, so as to be sent to the terminal through the network node. As another example, the threshold information may not be included in the first information. That is, it may not be sent to the terminal through the network node, but may be stored in the terminal or other devices connected with the terminal in advance, and the pre-stored or solidified threshold information may be directly used when a terminal judgment is needed. As another example, the terminal may obtain the threshold information in advance before receiving the first information. In addition, the network node may further update the pre-stored threshold information by sending the threshold information periodically or when needed.

According to the example of the disclosure, the information related to the terminal capability in the first information may include: a threshold corresponding to each terminal capability information among at least one terminal capability information. The at least one terminal capability information may include at least one of the following: terminal computing capability information, or terminal electric quantity information.

As a non-limiting example, the network node requires the terminal capability to reach a specific threshold before allowing the terminal to initiate the AI/ML operation-type service. For example, the network node may specify in the information related to the terminal capability: a threshold that a current computing capability margin of the terminal needs to reach (for example, the occupancy of at least one of the memory, CPU, and storage space of the terminal indicated in the form of the percentage), a threshold that a current electric quantity margin of the terminal needs to reach (may be in the form of the percentage), and/or a situation that the terminal needs to be in a charging state when the terminal electric quantity is lower than the needed threshold.

According to the example of the disclosure, the network node may send different first information for the different AI/ML operation-type services.

As an example, the network node may send a plurality of pieces of information in the first information and an indication rule specifying valid information in the first information to the terminal according to the AI/ML operation-type service that can be supported by the network node. The terminal may determine the valid information in the plurality of pieces of information according to the indication rule, and judge whether to initiate the AI/ML operation-type service according to the valid information. As a non-limiting example, the plurality of pieces of information may indicate the information related to the network node capability (for example, the at least one network node capability indication information and/or the corresponding threshold) and/or the information related to the terminal capability information (for example, the threshold corresponding to each of the at least one terminal capability information).

It may be understood that the indication rule may not be sent through the network node, but written or stored in the terminal or the device connected to the terminal in advance, or may be agreed on through a protocol. For example, the network node may merely send the plurality of pieces of information (such as the computing capability indication information, the radio resource capability indication information, the backlink bandwidth indication information and its corresponding threshold) and the indication rule specifying that the computing capability indication information and the radio resource capability indication information are valid information to the terminal. In this case, although the terminal receives the plurality of pieces of information, whether to initiate the AI/ML operation-type service is judged merely by using the computing capability indication information, the radio resource capability indication information and the corresponding thresholds according to the indication rule obtained locally.

As another example, the network node may pre-determine which information is valid according to the AI/ML operation-type service that can be supported by the network node, so as to send merely the valid information to the terminal. For example, the network node may pre-determine that the threshold of the radio resource capability indication information and/or the terminal electric quantity information is the valid information, so as to merely send the threshold of the radio resource capability indication information and/or the terminal electric quantity information to the terminal, so that the terminal may use them to judge whether to initiate the AI/ML operation-type service.

As another example, the information sent by the network node to the terminal is valid by default, so the terminal may use the received information to judge whether to initiate the AI/ML operation-type service.

According to the example of the disclosure, the access strategy information in the first information includes at least one of the following: indication information of whether to allow the terminal to initiate the artificial intelligence or machine learning operation-type service; access network type indication information; region indication information; access time indication information; indication information of a radio resource requirement; indication information of a network node computing capability requirement; or indication information of a terminal computing capability requirement.

As a non-limiting example, the access strategy information may be sent to the terminal by the split scheduler, or the access strategy information may be written to the terminal in advance in the form of firmware, or may be agreed upon in advance by the protocol, so as to facilitate the terminal in obtaining it when needed.

As a non-limiting example, the access network type indication information in the access strategy information represents a network type that the terminal needs to access.

For example, it may be specified in the access strategy information that merely when the terminal is under a public land mobile network (PLMN), the terminal may initiate the AI/ML operation-type service.

As a non-limiting example, the region indication information in the access strategy information represents a location where the terminal needs to be located. For example, it may be specified in the access strategy information that merely when the terminal is under a location area code (LAC), the terminal may initiate the AI/ML operation-type service.

As a non-limiting example, the access time indication information in the access strategy information represents a time period when the network node allows the terminal to initiate the AI/ML operation-type service.

As a non-limiting example, the indication information of the radio resource requirement, the indication information of the network node computing capability requirement and the indication information of the terminal computing capability requirement in the access strategy information may correspond to the above information related to the network node capability and corresponding threshold, and the information related to the terminal capability (for example, the threshold corresponding to each terminal capability information of the at least one terminal capability information). For brevity, the repeated description is omitted here.

Further referring to FIG. 2, the terminal may obtain the first information and determine whether to initiate the AI/ML operation-type service based on the obtained first information. When the terminal determines that the AI/ML operation-type service can be initiated through judgment, in step S120, the terminal initiates the AI/ML operation-type service to the network node.

In a non-limiting example, corresponding to step S110, obtaining the first information may include: the first information is received from the network node, or part of the information sent by the network node is received and another part of the information (for example, the threshold corresponding to each network node capability indication information among the at least one network node capability indication information or the access strategy information) written in advance is received from inside/outside of the terminal. The first information here is similar to the first information described above with reference to step S110. For brevity, the repeated description is omitted here.

A judgment operation of the terminal will be described in detail below. That is, whether to initiate the AI/ML operation-type service (i.e., the judgment operation of the terminal) may be determined by judging whether at least one of the at least one network node capability indication information meets the threshold, whether at least one of the at least one terminal capability information meets the threshold, and/or whether at least one of the access strategy information is met. As an example, determining whether to initiate the AI/ML operation-type service based on the first information may include at least one of the following: determining whether to initiate the AI/ML operation-type service in response to a comparison result between at least one of the at least one network node capability indication information and the corresponding threshold; determining whether to initiate the AI/ML operation-type service in response to a comparison result between at least one of the at least one terminal capability information and the corresponding threshold; or determining whether to initiate the AI/ML operation-type service in response to a judgment result of whether at least one of the access strategy information is met.

Similar to the above, the network node may send different first information for different AI/ML operation-type services, and the terminal may judge based on the information sent by the network node to determine whether to initiate the AI/ML operation-type service. For example, when the network node sends the plurality of pieces of information in the first information and the indication rule specifying the valid information in the first information to the terminal, the terminal may directly determine whether to initiate the AI/ML operation-type service according to the valid information specified by the indication rule in the plurality of pieces of information. For example, when the indication rule is written to the terminal or the device connected to the terminal in advance, the network node may merely send the plurality of pieces of information in the first information. When the terminal receives the plurality of pieces of information, the terminal may obtain the indication rule locally, then determine which information in the plurality of pieces of information is valid according to the indication rule, and use the valid information to judge whether to initiate the AI/ML operation-type service.

In other words, the terminal may determine at least one valid information from the first information, and determine whether the at least one valid information is met at the same time, thus judging whether to initiate the AI/ML operation-type service.

Assuming that the computing capability indication information and its threshold in the information related to the network node capability are valid, the step of judging by the terminal may include: in response to a comparison result that the computing capability (the occupancy of at least one of the memory, the CPU, and the storage space of the network node) of the network node is lower than or equal to the corresponding threshold (that is, the computing capability indication information meets the corresponding threshold), the terminal determines that the AI/ML operation-type service may be initiated.

Assuming that the radio resource capability indication information and its threshold in the information related to the network node capability are valid, the step of judging by the terminal may include: in response to a comparison result that the bandwidth provided by the network node is higher than or equal to the corresponding threshold (that is, the radio resource capability indication information meets the threshold), the terminal determines that the AI/ML operation-type service may be initiated, and/or in response to the terminal detecting that a signal strength or signal quality (for example, reference signal receiving power (RSRP)) is higher than or equal to the corresponding threshold (that is, the radio resource capability indication information meets the threshold), the terminal determines that the AI/ML operation-type service can be initiated.

Assuming that the backlink bandwidth indication information and its threshold in the information related to the network node capability are valid, the step of judging by the terminal may include: in response to a comparison result that the backlink bandwidth provided by the network node is higher than or equal to the corresponding threshold (that is, the backlink bandwidth indication information meets the threshold), the terminal determines that the AI/ML operation-type service can be initiated.

Assuming that the threshold corresponding to the terminal computing capability information in the information related to the terminal capability is valid, the step of judging by the terminal may include: in response to a comparison result that a current computing capability margin (for example, the occupation of at least one of the memory, the CPU, and the storage space) of the terminal reaches or is higher than the corresponding threshold (that is, the terminal computing capability information meets the threshold), the terminal determines that the AI/ML operation-type service may be initiated.

Assuming that the threshold corresponding to the terminal electric quantity information in the information related to the terminal capability is valid, the step of judging by the terminal may include: in response to a comparison result that a current electric quantity margin of the terminal reaches or is higher than the corresponding threshold (that is, the terminal electric quantity information meets the threshold), or although the current electric quantity margin of the terminal is lower than the corresponding threshold but is in a charging state, the terminal determines that the AI/ML operation-type service may be initiated.

Assuming that “indication information of whether to allow the terminal to initiate the AI/ML operation-type service” in the access strategy information is valid, the step of judging by the terminal may include: in response to the indication information being “indication information of allowing the terminal to initiate the AI/ML operation-type service”, the terminal determines that the AI/ML operation-type service may be initiated.

Assuming that the “access network type indication information” in the access strategy information is valid, the step of judging by the terminal may include: in response to the terminal meeting the network type (such as PLMN) indicated by the access network type indication information, the terminal determines that the AI/ML operation-type service may be initiated.

Assuming that the “region indication information” in the access strategy information is valid, the step of judging by the terminal may include: in response to the terminal meeting the location (such as LAC) indicated by the region indication information, the terminal determines that the AI/ML operation-type service may be initiated.

Assuming that the “access time indication information” in the access strategy information is valid, the step of judging by the terminal may include: in response to current time being in the time period for allowing to initiate indicated by the access time indication information, or in response to the current time not being in a time period for not allowing to initiate indicated by the access time indication information, the terminal determines that the AI/ML operation-type service may be initiated.

Assuming that a situation that the “indication information of the radio resource requirement, the indication information of the network node computing capability requirement, or the indication information of the terminal computing capability requirement” in the access strategy information is valid is similar to the above information related to the network node capability and the information related to the terminal capability, for brevity, the repeated description is omitted here.

For brevity, it is assumed in the above examples that one information of the first information is met. However, the examples of the disclosure are not limited to this. For example, the above examples may be combined in various ways.

In the first information, part of the information (such as the indication information of the radio resource requirement, the indication information of the network node computing capability requirement, or the indication information of the terminal computing capability requirement) in the access strategy information may be similar to first auxiliary information (that is, the information related to the network node capability and/or the information related to the terminal capability). Hence, there may be a case where second auxiliary information (i.e., the access strategy information) conflicts with the first auxiliary information. This kind of conflict usually occurs when the information related to the network node capability and/or the information related to the terminal capability is sent through the base station or the access point, and the access strategy information is sent through the split scheduler. In addition, the information sent by the base station or the access point to the terminal may also include the access time indication information (which may also be included in the above first auxiliary information), and may also conflict with the access time indication information in the access strategy information sent by the split scheduler.

In order to solve the problem, the communication method in the example of the disclosure may further include: in response to a conflict between information contained in the first information, priority information of the information with the conflict is obtained; and whether to initiate the AI/ML operation-type service is determined based on information with a high priority among the information with the conflict.

As a non-limiting example, the priority information may be determined by defining a rule or a protocol, the rule or the protocol may be written to the terminal or the device connected to the terminal in advance, so that the terminal can easily obtain the priority information. For example, the rule or the protocol may define that a priority of the access strategy information is higher than that of the first auxiliary information (for example, the access time indication information, the information related to the network node capability, and the information related to the terminal capability sent by the base station or the access point). In this case, when the conflict occurs, the terminal may consider that the first auxiliary information is covered by the access strategy information, so as to judge whether to initiate the AI/ML operation-type service based on the access strategy information. For another example, the rule or the protocol may define that a priority of the first auxiliary information is higher than the priority of the access strategy information (for example, a priority of a threshold provided by the first auxiliary information is higher than a priority of a threshold provided by the access strategy information). In this case, when the conflict occurs, the terminal may consider that the access strategy information is covered by the first auxiliary information, so as to determine whether to initiate the AI/ML operation-type service based on the information related to the network node capability and/or the information related to the terminal capability in the first auxiliary information.

In addition, the communication method in the example of the disclosure may further include: setting information related to the AI/ML operation-type service is obtained; and whether to initiate the AI/ML operation-type service is determined based on the setting information. That is to say, when judging whether to initiate the AI/ML operation-type service, the terminal may consider the setting information related to the AI/ML operation-type service provided by the user. For example, the setting information may be information related to a privacy setting of the user, or information corresponding to other settings (may be called user preference information) of the user. In this case, when the AI/ML operation-type business to be executed by the terminal involves the privacy of the user, even if the terminal receives the first information from the network node, the terminal may directly determine that the AI/ML operation-type service is not initiated to the network node according to the setting information (or the user preference information).

Figure 3:
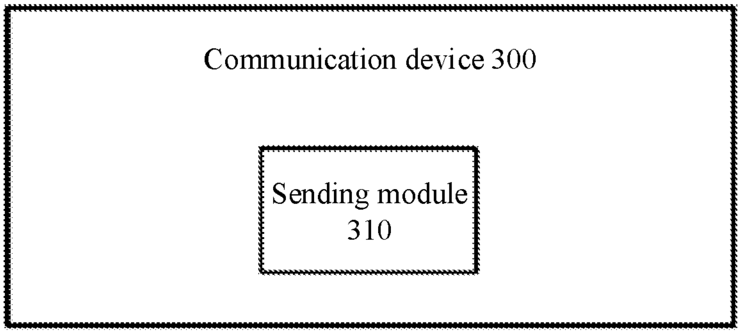
FIG. 3 is a schematic diagram of a communication device provided in an example of the disclosure.

FIG. 3 is a schematic diagram showing a communication device 300 according to an example of the disclosure.

Referring to FIG. 3, the communication device 300 may include a sending module 310. The sending module 310 is configured to send first information. The first information is used for enabling a terminal to determine whether to initiate an artificial intelligence or machine learning operation-type service. The description of the first information is similar to step S110 in FIG. 2, and the repeated description is omitted here for brevity.

According to the example of the disclosure, the sending module may be a node on a base station side, an access point in a wireless local area network, or a node on a core network side. As a non-limiting example, the sending module may include one or more separate modules. For example, the node on the base station side of the sending module, and the access point in the wireless local area network may send part of information in the first information, and the node (such as a split scheduler) on the core network side of the sending module may send another part of information in the first information, which has been described in detail in the above examples. The repeated description is omitted here for brevity.

It will be understood that a structure of the communication device 300 shown in FIG. 3 is merely an example, and the examples of the disclosure are not limited to this. For example, the communication device 300 may further include a processing device that processes the AI/ML operation-type service, or a device that communicates with a dedicated server providing the AI/ML operation-type service through a core network.

Figure 4:
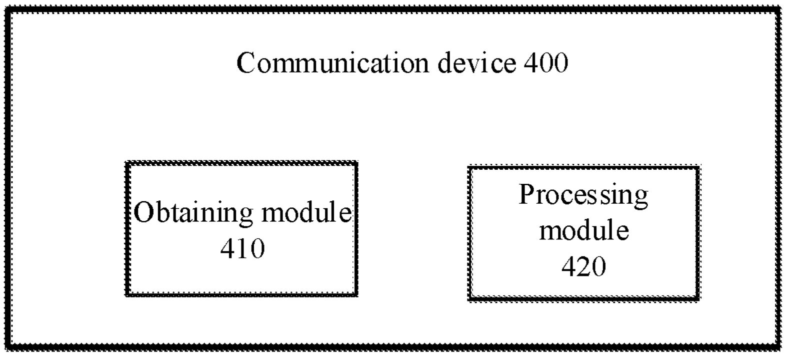
FIG. 4 is a schematic diagram of another communication device provided in an example of the disclosure.

FIG. 4 is a schematic diagram showing another communication device 400 according to an example of the disclosure.

Referring to FIG. 4, the communication device 400 may include an obtaining module 410 and a processing module 420.

According to the example of the disclosure, the obtaining module 410 may be configured to obtain first information. According to the example of the disclosure, the obtaining module 410 may be an access stratum (AS) of the terminal. As described above with reference to step S120 of FIG. 2, the obtaining module 410 (such as AS) may receive the first information from the sending module 310 of the communication device 300, or receive part of the information in the first information from the sending module 310 and obtain another part of the information in the first information from the inside.

According to the example of the disclosure, the processing module 420 may be configured to: determine whether to initiate the AI/ML operation-type service based on the first information.

According to the example of the disclosure, the processing module 420 may be a non-access stratum (NAS) as a high layer of the terminal. In one example, the AS of UE provides the obtained first information to the NAS, and the NAS comprehensively judges whether the AI/ML operation-type service may be initiated in a current cell based on the received first information.

According to the example of the disclosure, the processing module 420 (such as the NAS), when determining whether to initiate the AI/ML operation-type service based on the first information, may be configured to determine whether to initiate the AI/ML operation-type service through at least one of the following:

determining whether to initiate the AI/ML operation-type service in response to a comparison result between at least one of at least one network node capability indication information and a corresponding threshold; whether to initiate the AI/ML operation-type service in response to a comparison result between at least one of at least one terminal capability information and a corresponding threshold; or determining whether to initiate the AI/ML operation-type service in response to a judgment result of whether at least one of access strategy information is met.

According to the example of the disclosure, the obtaining module 410 may be configured to obtain setting information related to the AI/ML operation-type service, and the processing module 420 may determine whether to initiate the AI/ML operation-type service based on the setting information.

According to the example of the disclosure, the processing module 420 is further configured to: obtain, in response to a conflict between information contained in the first information, priority information of the information with the conflict; and determine whether to initiate the AI/ML operation-type service based on information with a high priority among the information with the conflict.

The processing module 420 may execute operations similar to a judgment operation of the terminal described with reference to FIG. 2. The repeated description is omitted here for brevity.

It will be understood that a structure of the communication device 400 shown in FIG. 4 is merely an example, and the examples of the disclosure are not limited to this. For example, the communication device 400 may further include a memory for storing various data and information, and/or a sending module for transmitting data needed by the AI/ML operation-type service to the network node, and the like.

The communication method and the communication device provided according to the examples of the disclosure can facilitate the terminal in judging whether the AI/ML operation-type service may be initiated.

It should be noted that since the device provided by the examples of the disclosure is the device that may execute the corresponding method provided in the example of the disclosure, based on the method provided in the example of the disclosure, those skilled in the art can understand the specific implementations and various variations of the device in the examples of the disclosure, and thus how the device implements the method in the examples of the disclosure will not be described in detail here. As long as the device used by those skilled in the art to implement the method in the examples of the disclosure belongs to the protection scope of the disclosure. Each module contained in the above device may be specifically realized by software and/or hardware.

The disclosure further provides an electronic device, which may include at least one processor. The processor may be configured to execute the method provided in any optional example of the disclosure.

Optionally, the electronic device may include at least one memory in which a computer program (or be referred to as a computer instruction or code) is stored. The above at least one processor may execute the communication method shown in any optional example of the disclosure when running the computer program.

The disclosure further provides a non-transitory computer-readable storage medium. The storage medium stores a computer program, and the computer program, when run by a processor, may execute the communication method shown in any optional example of the disclosure.

Figure 5:
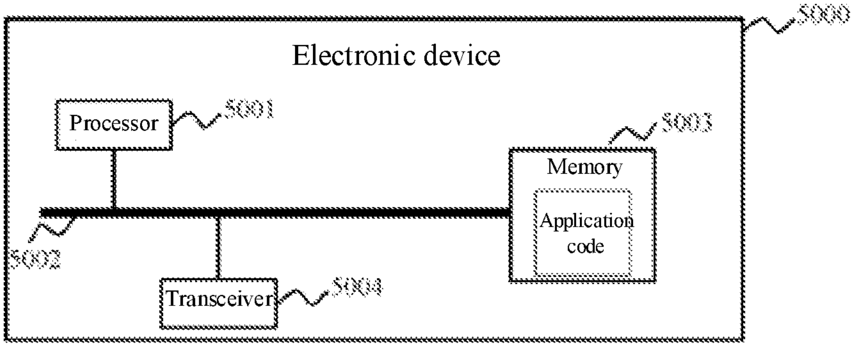
FIG. 5 is a schematic structural diagram of an electronic device provided by the disclosure.

As a non-limiting example, FIG. 5 shows a schematic structural diagram of an electronic device that can be applied to the solution provided in the disclosure. As shown in FIG. 7, the electronic device 5000 includes: a processor 5001 and a memory 5003. The processor 5001 is connected with the memory 5003, for example, through a bus 5002. Optionally, the electronic device 5000 may further include a transceiver 5004. It should be noted that in practical application, the transceiver 5004 is not limited to the quantity of one, and a structure of the electronic device 5000 does not constitute a limitation to the examples of the disclosure.

The processor 5001 may be a central processing unit (CPU), a general-purpose processor, a digital signal processor (DSP), an application-specific integrated circuit (ASIC), a field-programmable gate array (FPGA) or other programmable logic devices, transistor logic devices, hardware components or any combination thereof. The processor may implement or execute various example logic blocks, modules and circuits described in combination with the contents disclosed by the disclosure. The processor 5001 may also be a combination implementing a computing function, for example, a combination containing one or more microprocessors, a combination of DSP and a microprocessor, etc.

The bus 5002 may include a path for transmitting information among the above components. The bus 5002 may be a peripheral component interconnect (PCI) bus, or an extended industry standard architecture (EISA) bus. The bus 5002 may be divided into an address bus, a data bus, a control bus, and the like. For facilitating representation, the bus is merely represented with a thick line in FIG. 5, but it does not represent that there is merely one bus or any type of buses.

The memory 5003 may be a read only memory (ROM) or other types of static storage devices capable of storing static information and instructions, may be a random access memory (RAM) or other types of dynamic storage devices capable of storing information and instructions, may also be an electrically erasable programmable read only memory (EEPROM), a compact disc read only memory (CD-ROM) or other compact disc storage, optical disc storage (including a compression optical disc, a laser optical disc, an optical disc, a digital universal optical, a blue-ray disc and the like) and disk storage mediums or other magnetic storage devices, or any other mediums capable of being used to store expected program codes with instruction or data structure forms and capable of being accessed by a computer, but is not limited to this.

The memory 5003 is used to store and execute application program codes (computer program) of the solution of the disclosure, and the processor 5001 controls execution. The processor 5001 is used to execute the application program codes stored in the memory 5003, so as to implement the content shown in any of the aforementioned method examples.

It should be understood that although all the steps in the flow diagrams of the drawings are sequentially shown according to arrow indication, these steps are not necessarily executed sequentially according to the order indicated by arrows. Unless expressly stated here, execution of these steps has no strict order limitation, and these steps may be executed in any order. Moreover, at least a part of the steps in the flow diagrams of the drawings may include a plurality of substeps or a plurality of stages; these substeps or stages are not necessarily executed and completed at the same moment, and may be executed at different moments. The execution orders are not necessarily execution in sequence, and these substeps or stages may be alternately executed with other steps or at least part of the substeps or stages of other steps.

The above mentioned is merely part of the implementation of the disclosure. It should be noted that those skilled in the art should further make various improvements and embellishments without departing from the principle of the disclosure, and these improvements and embellishments should also be regarded as within the protection scope of the disclosure. In one aspect, the disclosure provides a communication method. The communication method includes: sending first information, where the first information is used for enabling a terminal to determine whether to initiate an artificial intelligence or machine learning operation-type service.

According to the example of the disclosure, the first information includes at least one of the following: information related to a network node capability; information related to a terminal capability; or access strategy information.

According to the example of the disclosure, the information related to the network node capability includes: at least one network node capability indication information.

According to the example of the disclosure, the information related to the network node capability further includes: a threshold corresponding to each network node capability indication information among the at least one network node capability indication information.

According to the example of the disclosure, the at least one network node capability indication information includes at least one of the following: computing capability indication information; radio resource capability indication information; or backlink bandwidth indication information.

According to the example of the disclosure, the information related to the terminal capability includes: a threshold corresponding to each terminal capability information among at least one terminal capability information.

According to the example of the disclosure, the at least one terminal capability information includes at least one of the following: terminal computing capability information; or terminal electric quantity information.

According to the example of the disclosure, the access strategy information includes at least one of the following: indication information of whether to allow the terminal to initiate the artificial intelligence or machine learning operation-type service; access network type indication information; region indication information; access time indication information; indication information of a radio resource requirement; indication information of a network node computing capability requirement; or indication information of a terminal computing capability requirement.

In another aspect, the disclosure provides a communication method. The communication method includes: obtaining first information; and determining whether to initiate an artificial intelligence or machine learning operation-type service based on the first information.

According to the example of the disclosure, determining whether to initiate the artificial intelligence or machine learning operation-type service based on the first information includes at least one of the following: determining whether to initiate the artificial intelligence or machine learning operation-type service in response to a comparison result between at least one of the at least one network node capability indication information and a corresponding threshold; determining whether to initiate the artificial intelligence or machine learning operation-type service in response to a comparison result between at least one of the at least one terminal capability information and a corresponding threshold; or determining whether to initiate the artificial intelligence or machine learning operation-type service in response to a judgment result of whether at least one of the access strategy information is met.

According to the example of the disclosure, the communication method further includes: obtaining setting information related to the artificial intelligence or machine learning operation-type service; and determining whether to initiate the artificial intelligence or machine learning operation-type service based on the setting information.

According to the example of the disclosure, the communication method further includes: obtaining, in response to a conflict between information contained in the first information, priority information of the information with the conflict; and determining whether to initiate the artificial intelligence or machine learning operation-type service based on information with a high priority among the information with the conflict.

In further another aspect, the disclosure provides a communication device. The communication device includes a sending module configured to send first information, where the first information is used for enabling a terminal to determine whether to initiate an artificial intelligence or machine learning operation-type service.

According to the example of the disclosure, the sending module is a node on a base station side, an access point in a wireless local area network, or a node on a core network side.

In further another aspect, the disclosure provides a communication device. The communication device includes: an obtaining module configured to obtain first information; and a processing module configured to determine whether to initiate an artificial intelligence or machine learning operation-type service based on the first information.

The disclosure further provides an electronic device. The electronic device includes a memory and a processor. The memory stores a computer program, and the computer program is used for executing the method described above in response to running the computer program.

The disclosure further provides a non-transitory computer-readable storage medium. The storage medium stores a computer program, and the computer program, in response to being run by a processor, is used for executing the method described above.

The invention claimed is:

1. A communication method, comprising:

sending a first part of first information by a node on a base station side or an access point in a wireless local area network, wherein the first information is used for enabling a terminal to determine to initiate an artificial intelligence or machine learning operation-type service, and the first part of the first information comprises at least one of information related to a network node capability or information related to a terminal capability;

sending a second part of the first information by a node on a core network side, wherein the second part of the first information comprises access strategy information;

determining, by the terminal, to initiate the artificial intelligence or machine learning operation-type service based on information with a high priority among conflicting information, in a case where a conflict exists between the first part of the first information and the second part of the first information;

wherein the information related to the network node capability comprises at least one network node capability indication information, and the at least one network node capability indication information comprises: backlink bandwidth indication information, computing capability indication information, and radio resource capability indication information, wherein the radio resource capability indication information comprises a bandwidth provided by the network node and a current spectrum utilization; and the backlink bandwidth indication information comprises; a bandwidth of an interface link between the base station and a dedicated server providing the artificial intelligence or the machine learning operation-type service, and a bandwidth of an interface link between a base station and a core network element; and wherein the access strategy information comprises at least one of the following:

indication information of allowing the terminal to initiate the artificial intelligence or machine learning operation-type service;

access network type indication information;

region indication information;

access time indication information;

indication information of a network node computing capability requirement; or indication information of a terminal computing capability requirement.

2. The communication method according to claim 1, wherein the information related to the network node capability further comprises:

a threshold corresponding to each network node capability indication information among the at least one network node capability indication information.

3. The communication method according to claim 1, wherein the information related to the terminal capability comprises:

a threshold corresponding to each terminal capability information among at least one terminal capability information.

4. The communication method according to claim 3, wherein the at least one terminal capability information comprises at least one of the following:

terminal computing capability information; or terminal electric quantity information.

5. The communication method according to claim 1, wherein the access strategy information further comprises indication information of a radio resource requirement.

6. A non-transitory computer-readable storage medium, storing a computer program, wherein the computer program, in response to being run by a processor, is used for executing the method according to claim 1.

7. The communication method according to claim 1, wherein the computing capability indication information comprises occupancy of at least one of a memory, a central processing unit (CPU), or a storage space of a network node.

8. The communication method according to claim 1, wherein the access network type indication information represents a network type that the terminal needs to access;

the region indication information represents a location where the terminal needs to be located; or the access time indication information represents a time period when the network node allows the terminal to initiate the artificial intelligence or the machine learning operation-type service.

9. The communication method according to claim 1, wherein the communication method further comprises:

sending an indication rule, wherein the indication rule is configured to specify valid information in the first information to the terminal.

10. A communication method, comprising:

obtaining a first part of first information from a node on a base station side or an access point in a wireless local area network, wherein the first part of the first information comprises at least one of information related to a network node capability or information related to a terminal capability;

obtaining a second part of the first information from a node on a core network side, wherein the second part of the first information comprises access strategy information; and determining to initiate an artificial intelligence or machine learning operation-type service based on the first information, wherein determining to initiate the artificial intelligence or machine learning operation-type service based on the first information comprises:

obtaining priority information of conflicting information in a case where a conflict exists between the first part of the first information and the second part of the first information; and determining to initiate the artificial intelligence or machine learning operation-type service based on information with a high priority among the conflicting information;

wherein the information related to the network node capability comprises at least one network node capability indication information, and the at least one network node capability indication information comprises: backlink bandwidth indication information, computing capability indication information, and radio resource capability indication information, wherein the radio resource capability indication information comprises a bandwidth provided by the network node and a current spectrum utilization; and the backlink bandwidth indication information comprises; a bandwidth of an interface link between the base station and a dedicated server providing the artificial intelligence or the machine learning operation-type service, and a bandwidth of an interface link between a base station and a core network element; and wherein the access strategy information comprises at least one of the following:

indication information of allowing the terminal to initiate the artificial intelligence or machine learning operation-type service;

access network type indication information;

region indication information;

access time indication information;

indication information of a network node computing capability requirement; or indication information of a terminal computing capability requirement.

11. The communication method according to claim 10, wherein the information related to the terminal capability comprises:

a threshold corresponding to each terminal capability information among at least one terminal capability information.

12. The communication method according to claim 11, wherein the at least one terminal capability information comprises at least one of the following:

terminal computing capability information; or terminal electric quantity information.

13. The communication method according to claim 11, wherein the access strategy information further comprises indication information of a radio resource requirement.

14. The communication method according to claim 11, wherein determining to initiate the artificial intelligence or machine learning operation-type service based on the first information further comprises at least one of the following:

determining to initiate the artificial intelligence or machine learning operation-type service in response to a comparison result between the at least one network node capability indication information and a corresponding threshold;

determining to initiate the artificial intelligence or machine learning operation-type service in response to a comparison result between the at least one terminal capability information and a corresponding threshold; or determining to initiate the artificial intelligence or machine learning operation-type service in response to a judgment result indicating that at least one of the access strategy information is met.

15. The communication method according to claim 10, wherein the information related to the network node capability further comprises:

a threshold corresponding to each network node capability indication information among the at least one network node capability indication information.

16. The communication method according to claim 10, further comprising:

obtaining setting information related to the artificial intelligence or machine learning operation-type service; and determining to initiate the artificial intelligence or machine learning operation-type service based on the setting information.

17. An electronic device, comprising:

a memory; and a processor; wherein the memory stores a computer program; and the processor is configured to perform the communication method according to claim 10 in response to running the computer program.

18. An electronic device, comprising:

a memory; and a processor; wherein the memory stores a computer program; and the computer program, when executed by the processor, causes the processor to:

send a first part of first information by a node on a base station side or an access point in a wireless local area network, wherein the first information is used for enabling a terminal to determine to initiate an artificial intelligence or machine learning operation-type service, and the first part of the first information comprises at least one of information related to a network node capability or information related to a terminal capability;

send a second part of the first information by a node on a core network side, wherein the second part of the first information comprises access strategy information;

determine, by the terminal, to initiate the artificial intelligence or machine learning operation-type service based on information with a high priority among conflicting information, in a case where a conflict exists between the first part of the first information and the second part of the first information;

wherein the information related to the network node capability comprises at least one network node capability indication information, and the at least one network node capability indication information comprises; backlink bandwidth indication information, computing capability indication information, and radio resource capability indication information, wherein the radio resource capability indication information comprises a bandwidth provided by the network node and a current spectrum utilization; and the backlink bandwidth indication information comprises; a bandwidth of an interface link between the base station and a dedicated server providing the artificial intelligence or the machine learning operation-type service, and a bandwidth of an interface link between a base station and a core network element; and wherein the access strategy information comprises at least one of the following:

indication information of allowing the terminal to initiate the artificial intelligence or machine learning operation-type service;

access network type indication information;

region indication information;

access time indication information;

indication information of a network node computing capability requirement; or indication information of a terminal computing capability requirement.

* * * * *